United States Patent [19]

Parkyn et al.

[11] 4,032,792
[45] June 28, 1977

[54] AUTOMOTIVE STARTER LOCKOUT SYSTEM

[75] Inventors: Derek John Parkyn, Westerham; Alexander Hendrich Francis Keuleman, Horley, both of England

[73] Assignee: U.S. Philips Corporation, New York, N.Y.

[22] Filed: Apr. 23, 1975

[21] Appl. No.: 570,617

[52] U.S. Cl. .............................. 290/37 R; 290/38 R
[51] Int. Cl.² ...................................... F02N 11/00
[58] Field of Search ............ 290/37, 38; 123/179 B, 123/179 BG

[56] References Cited

UNITED STATES PATENTS

| | | | |
|---|---|---|---|
| 3,629,597 | 12/1971 | Wiley | 290/38 |
| 3,857,043 | 12/1974 | Habasch | 290/37 |

*Primary Examiner*—David Smith, Jr.
*Attorney, Agent, or Firm*—Frank R. Trifari; Bernard Franzblau

[57] ABSTRACT

An electronic lockout system for the starter motor of an internal combustion engine includes means for operating the starter motor only when the engine flywheel is stationary. If the starter switch is released and quickly closed again, the system also includes circuit means by which the starter motor is reoperated immediately provided that the release time is only a few milliseconds.

11 Claims, 1 Drawing Figure

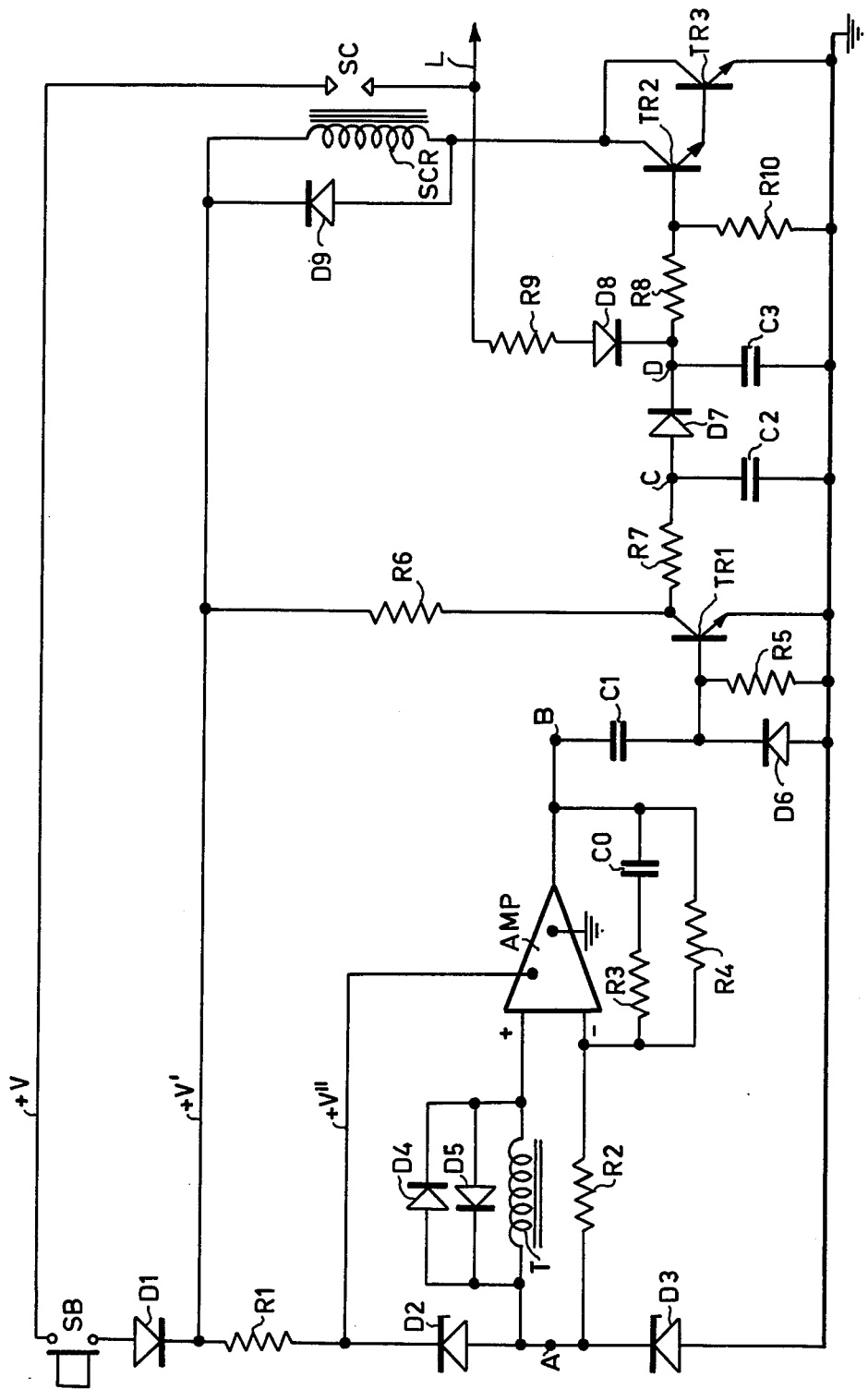

AUTOMOTIVE STARTER LOCKOUT SYSTEM

This invention relates to a starter motor lockout system for an internal combustion engine.

According to the invention such a system comprises a starter switch, a transducer co-operable with a toothed annular member which is rotatable with the engine for detection of rotational movement of the engine to produce an alternating electric output the frequency of which is a function of the speed of rotation of the engine, a semiconductor switch responsive to said electric output to control the mean charge on a capacitor which forms a delay means, said capacitor being connected in a charging circuit while the starter switch is operated and being connected periodically in a discharging circuit by the semiconductor switch at a rate determined by the frequency of said alternating electric output, a semiconductor output stage which is operative to energise an auxiliary starter relay only when the mean charge on said capacitor has a predetermined value which is not attained for a predetermined period after the starter switch has been operated with the engine at rest due to the time constant of the charging circuit, said relay being effective on energisation to close contacts to complete an energising circuit for a main starter relay or solenoid that supplies current to the starter motor, and a latching circuit for maintaining the semiconductor output stage operative while the starter switch is operated.

Preferably, the system includes a further capacitor which acquires sufficient charge while the output stage is operative, for maintaining the output stage operative for a further predetermined period after the starter switch has been released, the duration of this further predetermined period being less than the starter motor pinion disengagement time.

The transducer is suitably an electro-magnetic transducer for detecting movement of gear teeth on the starter ring gear attached to the engine.

Various techniques are already known in starter motor lockout systems to detect when rotational movement of the engine has ceased, for example, by sensing the voltage output of the dynamo or alternator of the vehicle, by sensing a voltage output which is produced due to rotation of the distributor on the engine, or by sensing a low value of oil pressure in the engine. However, these prior art systems may have limitations as to their reliablity because the dynamo or alternator voltage output will be very low at low engine speeds so that it may be difficult to sense when engine rotation has actually ceased furthermore, systems sensing rotation of a distributor would not be applicable to diesel engines, and a low value of oil pressure would vary as a function of oil viscosity and temperature. None of these limitations is present with a system according to the present invention which is eminently suited for use in long vehicles with rear-located diesel engines, such as buses or coaches.

An embodiment of the invention will now be described, by way of example, with reference to the accompanying drawing the single FIGURE of which shows the electrical and electromechanical circuit diagram of a starter motor lockout system according to the invention.

The starter motor lockout system shown in the drawing is suitable for a vehicle with a negative ground and, therefore, one terminal of a starter switch SB of the system is connected to the positive supply line +V of the vehicle. The other terminal of the starter switch SB is connected via a diode D1 to a resistor R1 and to a subsidiary supply line at a voltage +V'. The other end of resistor R1 is connected via a series connection of two Zener diodes D2 and D3 to ground and to a further supply line at a voltage +V'' which supplies the positive voltage for a differential amplifier AMP. This amplifier AMP is also connected to ground as shown to provide the negative voltage return for it. A point A is connected to a resistor R2 and to one end of a transducer T. The transducer T is, for example, an electro-magnetic transducer which detects the movement of gear teeth on the starter ring gear attached to the engine. The transducer T is connected in parallel with opposed diodes D4, D5 and the other end of transducer T is connected to the positive input terminal of the amplifier AMP. The other end of resistor R2 is connected to the negative input terminal of the amplifier AMP. The output of the amplifier AMP is connected to one side of a capacitor C1 and to the parallel combination of a capacitor C0 in series with a resistor R3 and a resistor R4 which in turn is connected to the negative input of the amplifier AMP to form a feedback loop.

The other side of capacitor C1 is connected via a parallel combination of a diode D6 and a resistor R5 to ground and to the base of a transistor TR1. The emitter of transistor TR1 is connected to ground and the collector of transistor TR1 is connected via a resistor R6 to the supply line at the voltage +V' and via a resistor R7 to one side of a capacitor C2 and to the anode of a diode D7. The cathode of diode D7 is connected to one side of a capacitor C3, to the cathode of a diode D8 and to one side of a resistor R8. The other sides of capacitors C2 and C3 are grounded. The anode of diode D8 is connected via a resistor R9 to the side of auxiliary starter relay contacts SC remote from the positive supply line +V. The other side of resistor R8 is connected to the base of a transistor TR2 and via a resistor R10 to ground. Transistors TR2, TR3 form a Darlington connected output stage having their commoned collectors connected to one end of an auxiliary starter relay coil SCR, the other end of which is connected to the supply line at the voltage +V'. A diode D9 is connected across the coil SCR as shown.

The system operates as follows. Providing that the starter switch SB is not operated there is no voltage +V' and no voltage +V'' supplied to the circuitry. The circuitry is therefore electrically dead.

When the starter switch SB is operated, the voltage +V' and the voltage +V'' appear, as shown. The voltage +V'' is stabilised by the Zener diodes D2 and D3 and the bias potential at the point A is stabilised by the Zener diode D3. Providing there is no movement of the engine, which is detected by the transducer T operating on the starter ring gear, the amplifier AMP will give a zero volts output since the potentials at its positive and negative input terminals will be equal. Transistor TR1 will therefore be off and capacitors C2 and C3 will begin to charge slowly through resistors R6, R7 and diode D7. A certain amount of discharging will take place through resistors R8 and R10 to ground. The circuit values are chosen such that after a time delay of, for example, two seconds the potential at point D will rise to a value such that the potential on the base of transistors TR2 and TR3 is sufficient to turn them on, hence supplying a current to the starter relay coil SCR. The starter relay contacts SC are then closed and a main starter relay or solenoid (not shown) is energised by the voltage +V extended thereto over a lead L via the closed contacts SC. Current is then supplied to the starter motor which will begin to turn the ring gear on the engine. In order to ensure that the detection of the movement of the ring gear does not cause the starter contacts SC to be opened, a latching circuit consisting of resistor R9 and diode D8 is included. The voltage +V will appear on resistor R9 and via diode D8 and resistor R8 will lock the transistors TR2 and TR3 into conduction during the whole of the time that the starter switch SB is continuously depressed.

About 10 msecs after this latching voltage has been provided, the transducer T detects that the ring gear is moving and supplies a positive voltage to the positive input of the differential amplifier AMP causing a positive output voltage to appear at point B. This causes transistor TR1 to turn on and therefore capacitor C2 is discharged to ground via the resistor R7 and the collector emitter path of transistor TR1. Diode D7 will then be reverse biased.

Providing the starter switch SB is continuously depressed the starter motor will continue to be energised. It will be noted that the output from transducer T is an alternating voltage. This will cause transistor TR1 to turn 'on' and 'off' periodically. However, it is arranged that the rate of charging current supplied by resistors R6, R7 is so low compared with the rate of discharge current via resistor R7 and the collector-emitter path of transistor TR1, that capacitor C2 will effectively remain discharged towards zero volts.

When the starter switch SB is released the voltages +V' and +V" disappear. The starter relay contacts SC will open after a short delay and the starter motor will be de-energised. The ring gear, due to the weight of the engine fly-wheel, will continue to rotate for some time. Capacitor C3 will be discharging via resistors R8 and R10 to ground. If the starter switch SB is re-operated immediately or only a short time after release, it is arranged that the capacitor C3 will have retained sufficient charge so that the potential at the base of transistor TR2 will still to cause transistors TR2 and TR3 to conduct and therefore the starter relay coil SCR will be re-energised and the starter relay contacts SC will close and the starter motor will continue to drive the ring gear. This time is arranged to be very short, of the order of 20–30 milliseconds, so that an inadvertant release of the starter switch SB does not result in a lockout operation taking place until the time that the starter motor drive pinion may have been disengaged from the ring gear.

After this time, however, the voltage at point D will drop to a level such that the voltage on the base of transistor TR2 is not sufficient to cause transistors TR2, TR3 to conduct. Therefore, if the starter switch SB is re-operated after this time the starter relay coil SCR will not be energised immediately. The energisation of the starter relay coil SCR will once again be determined by the time taken for capacitors C2 and C3 to charge up to the required potential to turn on transistors TR2 and TR3. This time will of course not commence until the transducer T has detected that the ring gear has stopped moving. A further two seconds is then allowed such that any kick-back via the engine will cause the lockout system to operate until the engine finally comes to rest. The period of two seconds therefore will operate from the time that the engine finally comes to rest.

Diode D9 is included in the circuitry to absorb the stored energy released when the starter relay coil SCR is de-energised, so ensuring that this energy does not cause excessive voltage swings on the collectors of transistors TR2 and TR3.

The combination C0, R4 and R3 used as a feedback for the amplifier AMP serves to define the DC gain of the amplifier and to counteract the inherent rising response of the transducer T with increase in speed of rotation of the ring gear such that a low output from the transducer T at low rotational speeds of the ring gear is maximised.

In practise, the output from the transducer T may be of sufficient power to operate the switching transistor TR1 directly without the amplifier AMP.

In a practical circuit the component values were as follows:
+V = 24 volts
Diode D1 = BYX 38
Zener Diodes, D3 = BZY 88
Diodes D4, D5, D6, D7, D8 = BAX 13
Diode D9 = BYX 36
Resistor R1 = 470 ohms
Resistor R2 = 330 ohms
Resistor R3 = 2.2K ohms
Resistor R4 = 330 Kohms
Resistor R5 = 1 M ohms
Resistor R6 = 6.8K ohms
Resistor R7 = 100 ohms
Resistor R8 = 330 ohms
Resistor R9 = 3.9K ohms
Resistor R10 = 1.5K ohms
Transistor TR1 = BC108
Tr2, TR3 = Darlington Pair (4 Amps)
Capacitors
C1 = 1$\mu$ Farad
C2 = 500$\mu$ Farad
C3 = 150$\mu$ Farad

What we claim is:

1. A starter motor lockout system for an internal combustion engine comprising, a starter switch, a transducer arranged to cooperate with a toothed annular member which is rotatable with the engine for detecting rotational movement of the engine to produce an alternating electric output signal whose frequency is a function of the speed of rotation of the engine, delay means including a capacitor, a semiconductor switch responsive to said electric output signal and coupled to said capacitor to control the mean charge thereon, means connecting said capacitor in a charging circuit while the starter switch is operated, the capacitor being connected periodically in a discharging circuit by the semiconductor switch at a rate determined by the frequency of said alternating electric output signal, a semiconductor output stage which is operative to energise a starter relay only when the mean charge on said capacitor has a predetermined value, which value is not attained for a predetermined time period after the starter switch has been operated with the engine at rest due to the time constant of the charging circuit, said relay being effective upon energisation thereof to close contacts to complete an energising circuit that supplies current to the starter motor, and a latching circuit for maintaining the semiconductor output stage operative while the starter switch is operated.

2. A system as claimed in claim 1 further comprising a second capacitor which acquires a sufficient charge while the output stage is operative for maintaining the output stage operative for a further predetermined time period after the starter switch has been released, the duration of this further predetermined time period being less than the starter motor pinion disengagement time.

3. A system as claimed in claim 1 wherein the transducer comprises a magnetic pick-up device for sensing rotational movement of the ring gear on the engine.

4. A starter motor lockout system for an internal combustion engine comprising, a starter switch, delay means including a capacitor, a semiconductor switch coupled to said capacitor to control the mean charge thereon, means for applying an input signal whose frequency is a function of the engine rotational speed to a control electrode of the semiconductor switch, a charge circuit coupling said capacitor to a source of supply voltage by means of said starter switch, means including the semiconductor switch for periodically connecting the capacitor in a discharge circuit at a rate determined by the frequency of said input signal, a starter relay having contacts to complete a circuit for energizing the starter motor upon energization of the starter relay, a semiconductor output amplifier having an output coupled to the starter relay and a control electrode responsive to the capacitor charge voltage and operative to energize said starter relay if the mean charge on the capacitor exceeds a predetermined value, the capacitor reaching said predetermined value a predetermined time period after the starter switch is operated and with the engine at rest, said time period being determined by the time constant of the charge circuit, and a latching circuit coupled to the control electrode of the semiconductor output amplifier for holding the output amplifier operative while the starter switch is operated.

5. A system as claimed in claim 4 further comprising means for coupling the latching circuit to said source of supply voltage via said starter relay contacts.

6. A system as claimed in claim 4 further comprising a second capacitor coupled to said latching circuit and to the output amplifier control electrode for biasing the output amplifier into said operative state for a further predetermined time period after release of the starter switch.

7. A system as claimed in claim 4 wherein said charge circuit includes a first resistor connected in series with the capacitor and the starter switch across said source of supply voltage, and said discharge circuit includes a second resistor connected in series with said semiconductor switch across the capacitor terminals.

8. A system as claimed in claim 7 further comprising a second capacitor coupled to the output amplifier control electrode and to the first capacitor via a diode, said second capacitor being coupled to said source of voltage via the latching circuit and the starter relay contacts.

9. A system as claimed in claim 4 wherein said input signal applying means comprises a transducer for generating an alternating signal during engine rotation which signal alternately biases said semiconductor switch into conduction and cut-off at a rate such that the mean charge on the capacitor is below said predetermined value thereby developing a voltage thereacross which is insufficient to drive the output amplifier into said operative state.

10. A system as claimed in claim 4 further comprising means for directly connecting the latching circuit to said supply voltage source via said starter relay contacts, and wherein the operating voltages for the semiconductor switch and the output amplifier are derived from said supply voltage source via the starter switch.

11. A system as claimed in claim 4 wherein the time constant of the charge circuit is longer than the time constant of the discharge circuit.

* * * * *

UNITED STATES PATENT AND TRADEMARK OFFICE
CERTIFICATE OF CORRECTION

PATENT NO. : 4,032,792

DATED : June 28, 1977

INVENTOR(S) : DEREK JOHN PARKYN ET AL

It is certified that error appears in the above-identified patent and that said Letters Patent are hereby corrected as shown below:

IN THE SPECIFICATION

Col. 1, line 52, "ceased furthermore" should be --ceased. Furthermore--.

Signed and Sealed this

Second Day of May 1978

[SEAL]

Attest:

RUTH C. MASON
Attesting Officer

LUTRELLE F. PARKER
Acting Commissioner of Patents and Trademarks